United States Patent [19]
Kuenen

[11] Patent Number: 5,850,781
[45] Date of Patent: Dec. 22, 1998

[54] OVEN WITH ZONES SITUATED ABOVE ONE ANOTHER

[75] Inventor: Hendrikus Antonius Jacobus Kuenen, Overloon, Netherlands

[73] Assignee: Koppens B.V., Bakel, Netherlands

[21] Appl. No.: 950,998

[22] Filed: Oct. 15, 1997

[30] Foreign Application Priority Data

Oct. 15, 1996 [NL] Netherlands ............................ 1004285

[51] Int. Cl.⁶ ................................ A21B 1/02; A21B 1/48; A47J 27/16; A47J 37/04
[52] U.S. Cl. ............................ 99/443 C; 34/147; 99/386; 99/479; 126/21 A; 198/778; 432/58; 432/138; 432/143
[58] Field of Search .............................. 99/352–355, 386, 99/443 R, 443 C, 476, 477–479; 34/75, 78, 147, 203, 207; 62/381; 126/21 A, 21 R; 198/778, 883; 219/388; 432/212, 143–145, 147, 2, 14, 58, 133, 134, 138

[56] References Cited

U.S. PATENT DOCUMENTS

| | | |
|---|---|---|
| 3,269,142 | 8/1966 | De Mola et al. . |
| 4,118,181 | 10/1978 | Onodera . |
| 5,078,120 | 1/1992 | Hwang ................................. 126/21 A |
| 5,109,758 | 5/1992 | Voegtlin .............................. 99/443 C |
| 5,322,007 | 6/1994 | Caridis et al. ....................... 99/443 C |
| 5,515,775 | 5/1996 | Crump, III et al. ..................... 99/479 |
| 5,702,245 | 12/1997 | London ................................ 99/476 X |

FOREIGN PATENT DOCUMENTS

| | | |
|---|---|---|
| 0 528 593 | 2/1993 | European Pat. Off. . |
| WO 92/21596 | 12/1992 | WIPO . |

*Primary Examiner*—Timothy F. Simone
*Attorney, Agent, or Firm*—Young & Thompson

[57] ABSTRACT

An oven comprises a housing with at least two zones, which are each provided with a device for setting a cooking state in the relevant zone, such as the temperature and relative humidity, as well as a conveyor belt, which runs through each of the zones and on which food products to be heated can be held, which conveyor belt has at least one path with a plurality of windings. These two zones are situated one above the other. Each zone has at least one ventilation device and also a heating device for circulating hot air through that zone and parallel to the boundary region between two zones.

20 Claims, 2 Drawing Sheets

OVEN WITH ZONES SITUATED ABOVE ONE ANOTHER

FIELD OF THE INVENTION

The invention relates to an oven, comprising a housing with at least two zones, which are each provided with means for setting a cooking state in the relevant zone, such as the temperature, relative humidity and/or air speed, as well as a conveyor belt, which runs through each of the zones and on which food products to be heated can be held, which conveyor belt has at least one path with a plurality of windings.

BACKGROUND OF THE INVENTION

An oven of this kind is known from NL-A-9200351. This known oven has a housing, in which is situated a conveyor belt which has two helical paths which are accommodated in two adjacent zones in which different cooking states can be set.

An oven of this kind can be used very flexibly; for example, in one and the same production passage through the oven, a preliminary baking process can be carried out in the first zone, followed by secondary cooking in the second zone. Obviously, various other combinations of cooking states are also possible, while it is also possible to set identical cooking states.

SUMMARY OF THE INVENTION

Since the housing has two zones situated next to one another, each large enough for a helical path of the conveyor belt, this known oven requires a relatively large installation area. In certain cases, this may be a disadvantage. The object of the invention is therefore to provide an oven of the type comprising a plurality of cooking zones which, nevertheless, requires little installation area. This object is achieved by the fact that two zones are situated one above the other.

In theory, the oven according to the invention can be half as large as the known oven. It is even possible to accommodate more than two, for example three or four, zones above one another in the oven. Obviously, the oven according to the invention is higher than the known oven, but by no means always does this have to cause problems.

In order to achieve the various cooking states, each zone has at least one ventilation device and also a heating device for circulating hot air through that zone and parallel to the boundary region between two zones. Preferably, a partition is situated between two adjacent zones, which partition has a passage for the conveyor belt. A partition of this kind allows the difference in cooking state to be maintained exceptionally well.

The partition may be designed as an intermediate base which has a separating strip which runs along the path of a winding, is cut out in the shape of a curl and is situated between two successive windings. The curled separating strip is situated just below one of the windings, so that the products which are situated on the winding situated below the separating strip can be conveyed without hindrance.

The windings of the conveyor belt may be supported in a known manner on a drum; the separating strip then extends as far as the drum, leaving a gap clear. The small gap scarcely forms a connection between the two zones, so that there will be only minimal exchange and the various cooking states can be excellently maintained.

In this connection, reference is made to the oven which is known from U.S. Pat. No. 5,078,120 and which has an intermediate floor in which is situated an annular, wide opening with a helically wound conveyor belt. This conveyor belt has windings which rest directly on one another, with upright longitudinal walls which ensure complete closure of the windings. The heated air which is blown into the space above the intermediate floor flows towards the space below the intermediate floor via the openings in the permeable grating belt and via the annular opening. Thus the pressure and the temperature of the heated air decrease gradually, but there is no question of there being two separately controlled zones, each with their own adjustable cooking state.

In the oven according to the invention, the separating strip may furthermore be connected over at least part of its periphery to a vertically extending casing, which surrounds the path comprising windings of the conveyor belt at least partially in a close-fitting manner.

The separating strip may be provided with means for collecting liquids which drip down from the windings situated at a relatively high level, as well as with drainage means for the liquids collected.

An additional advantage of the oven according to the invention is that the partition can be arranged at different levels. One zone may thus contain more windings than the other, with the result that the cooking duration in one zone is different from the cooking duration in the other zone.

Preferably, each zone has two mutually opposite casing parts, between which the path comprising windings of the conveyor belt is accommodated in a close-fitting manner. Two or more flow ducts, which lie above one another, may be situated between each casing part and the adjacent internal wall of the housing, which flow ducts are each in communication with an associated zone, and in which flow ducts there are in each case arranged heating means and a ventilator for generating a hot-air flow.

Thus two ventilators with a heating device are active in each zone, each of which ventilators covers approximately half of each winding.

To complete the separation between the zones situated above one another, the flow ducts situated above one another may also be separated, between each casing and the adjacent internal wall, by the intermediate base.

As has already been mentioned, if there is sufficient installation area available, an oven with zones situated next to one another may also be used. In this connection, the invention provides an improvement to t his known oven, of which the conveyor belt has two mutually connected paths comprising windings, one of which paths provides an upward conveying movement and the other of which paths provides a downward conveying movement, between which paths a partition is provided and the second of which paths passes through at least a first further zone provided with means for setting a cooking state. The first path thereof may be designed with zones situated above one another, as described above, while the second path may possess at least a first further zone provided with means for setting a cooking state. The second path may also possess a second further zone which is situated beneath the first further zone. An oven designed in this way may possess a minimum of three different zones, each with their own adjustable cooking state.

BRIEF DESCRIPTION OF THE DRAWING

The invention will be described in more detail below with reference to an exemplary embodiment depicted in the figures, in which.

DETAILED DESCRIPTION OF THE INVENTION

Figure 1:
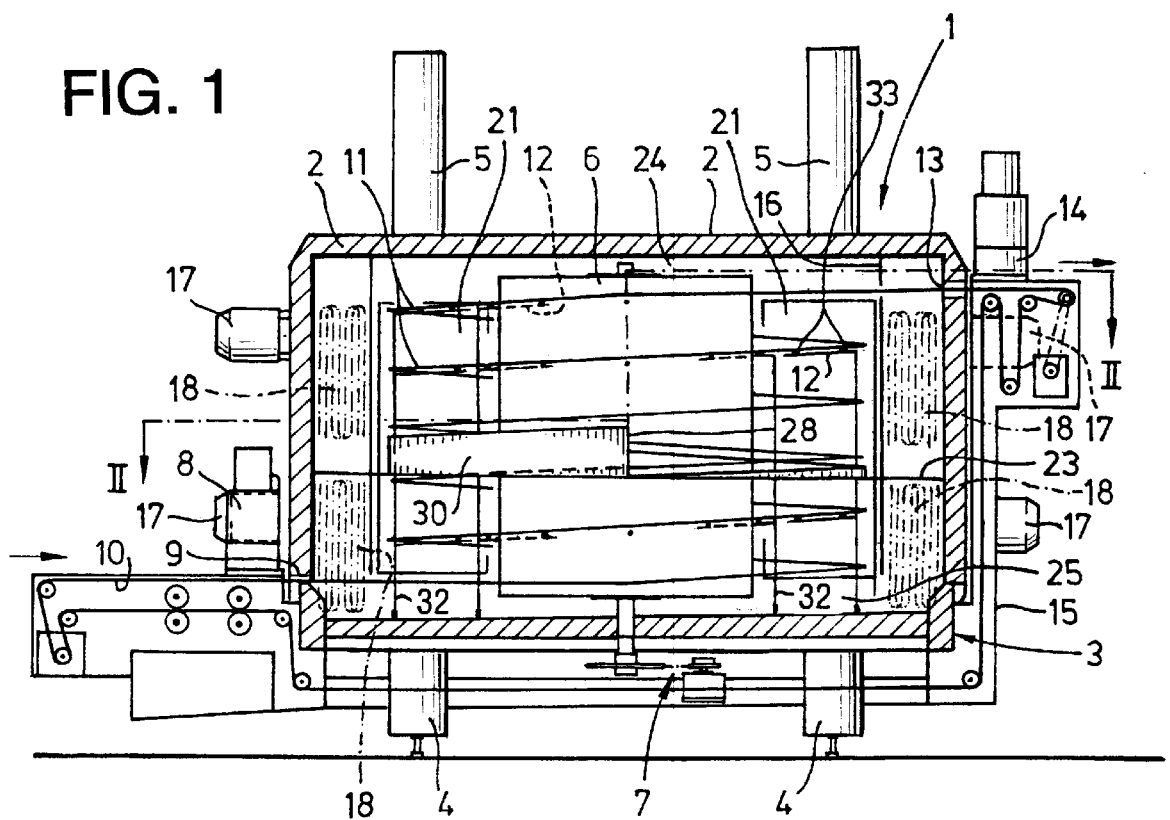
FIG. 1 shows a side view, partially in section, of the oven.

The oven depicted in the figures comprises an insulated housing 1, which has a hood 2 which rests on a base 3, which is supported on a floor by means of legs 4. The hood 2 can be lifted off the base 3 by means of known lifting devices 5, thus providing access to the inside of the oven.

Figure 2:
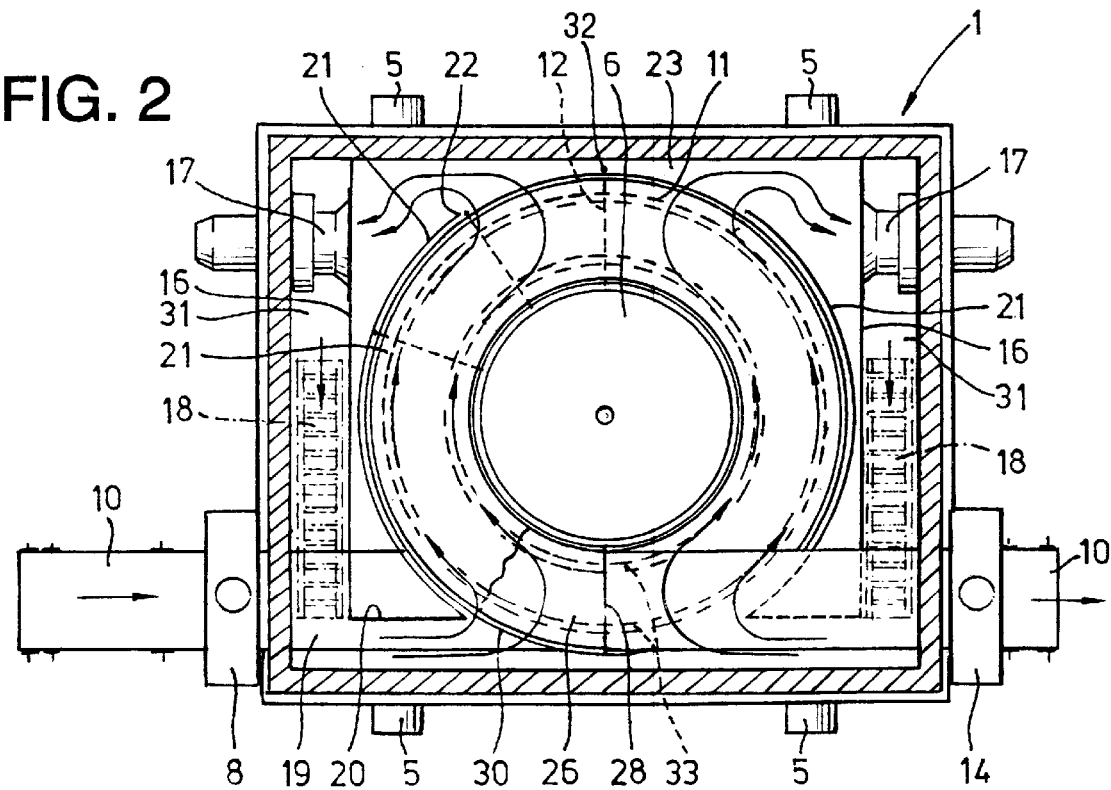
FIG. 2 shows the oven in the section along II—II of FIG. 1.

A drum 6 is mounted rotatably on the base 3, which drum can be driven to the left, as seen in the top view of FIG. 2, by means of the drive device which is denoted by 7.

The conveyor belt, which is denoted by 10, is guided into the housing via extraction device 8 and opening 9. The conveyor belt then follows a helical line comprising a plurality of windings 11, supported by a belt support which is known per se. This support comprises transverse bars 12 which are supported on the base 3 by means of legs 32. The transverse bars, which end at a certain distance from the drum 6, are arranged on a helical course, distributed evenly around the drum. They are connected to one another by plastic strips 33, over which the conveyor belt 10 slides. The conveyor belt 10 becomes clamped around the drum 6 as soon as the latter is driven in motion. The conveyor belt leaves the housing 1 via opening 13 and extraction device 14. The conveyor belt is guided back to the starting opening 9 in a known manner, via the case 15.

A vertical partition 16, into which the suction opening of the ventilators 17 opens, is positioned on either side of the helical path comprising windings 11. As shown in FIG. 2, the air which is thus drawn in by the ventilators 17 is then guided past the heating devices 18, after which the heated air passes between the windings 11 of the belt via duct 19, which is delimited by the internal wall of the housing and the partition component 20. As can be seen in FIG. 2, in the process the air flows over about half of each winding and is then sucked in again by the relevant ventilator.

In order to force the air to flow through between the windings 11, casing parts 21 are provided, which on one side adjoin the partition component 20 and on the other side end at the free edge 22. The air then flows back to the ventilators 17 along the free edge 22.

As can be seen in FIG. 2, two separate air flows are obtained, each covering about half of a winding.

As can be seen in FIG. 1, the internal space of the housing 1 is divided by an intermediate floor 23 into two cooking zones, namely an upper cooking zone 24 and a lower cooking zone 25. Each of these cooking zones has two mutually opposite ventilators 17 and associated heating devices 18. The intermediate floor 23 therefore also extends between in each case a partition 16 and the opposite internal wall of the hood 2.

As can be seen from the top view shown in FIG. 2, the intermediate floor runs virtually as far as the external surface of the drum, so that there will be scarcely any exchange between the cooking zones 24 and 25.

Figure 3:
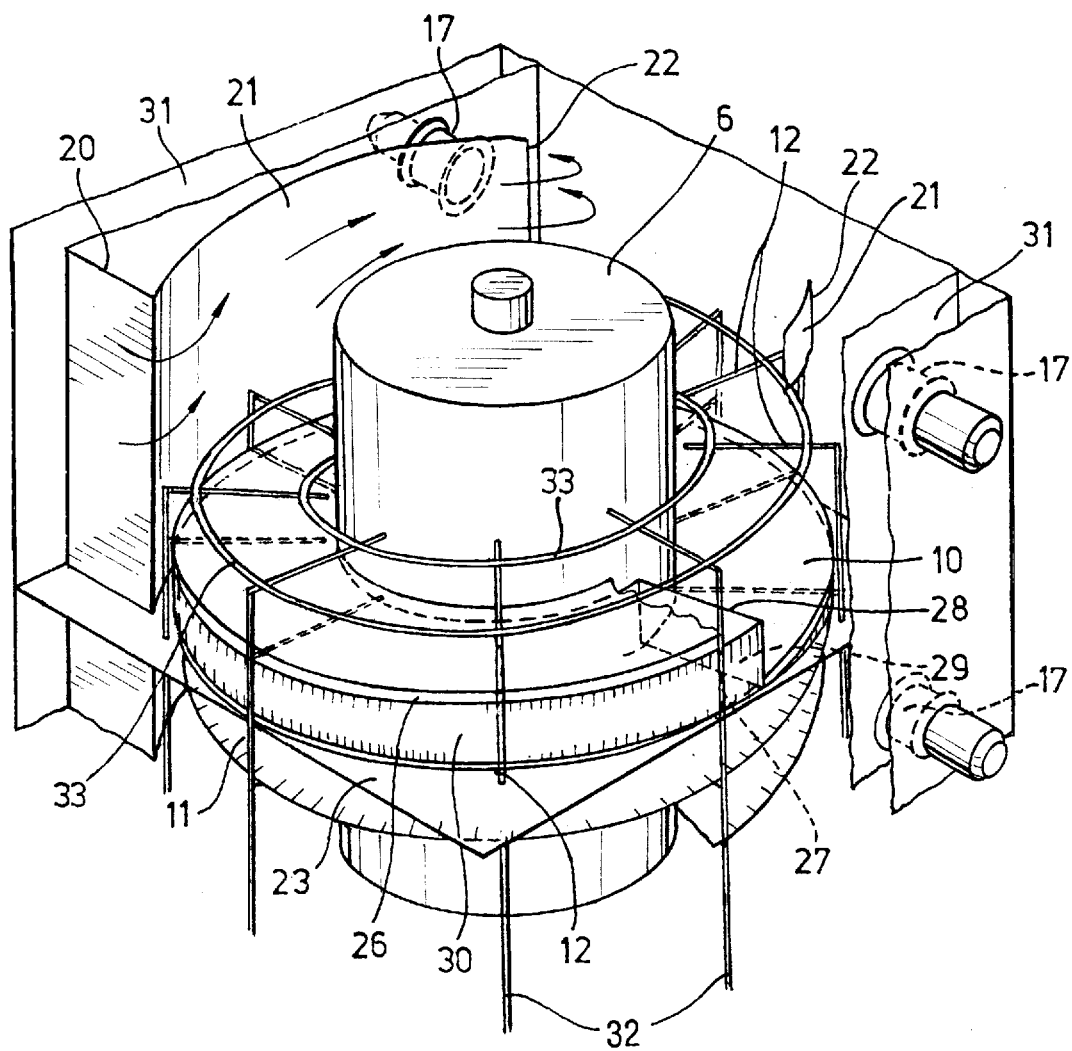
FIG. 3 shows a part of the interior of the drum, in perspective.

In order to be able to guide the windings of the conveyor belt 10 through the intermediate floor, a curled ring 26 is cut out from this intermediate floor. This curled ring 26 (see FIG. 3) starts at the level of the intermediate floor 23, at the edge 28 indicated by 27 and formed by cutting out the curl 26. The curl then runs through 360° around the drum and ends at the upper edge 28. An opening 29, through which the conveyor belt 10 and the products situated thereon can move, is defined between the upper edge, 28 and the lower edge 27.

The external edge of the curl 26 is closed off from the rest of the intermediate floor 23 by means of a strip 30.

The opening through which the belt 10 with the products can pass is in any case relatively small, so that there too there will be scarcely any exchange between the two cooking zones 24, 25.

In use, the products to be baked are placed on that section of the conveyor belt which is situated close to the opening 8, after which they are guided through the first cooking zone 25. In this cooking zone, a certain cooking state can prevail, such as temperature, humidity, air speed and the like. Then, the belt with products passes through the opening 29 in the intermediate floor 23, after which they move into the second cooking zone 24. A different cooking state, which is suitable, for example, for secondary cooking, may prevail in this zone. The belt moves at a constant speed along the entire path, so that it is also possible to obtain different residence times in the cooking zones 24 and 25 by placing the intermediate floor 23 at different levels.

I claim:

1. Oven for heating food products, comprising:
   a housing defining a plurality of separate zones with at least two of said zones being located above one another;
   each zone having separate means for setting a cooking state in the relevant zone, said cooking state including at least one of temperature and relative humidity; and
   a conveyor belt for supporting food products to be heated, said conveyor belt being structured and arranged to run through each of the zones, and having at least one path with a plurality of windings.

2. The oven according to claim 1, wherein each zone has at least one ventilation device and a heating device for circulating hot air through that zone and parallel to a boundary region between two zones.

3. The oven according to claim 2, further comprising a partition situated between two adjacent zones, said partition having a passage for the conveyor belt.

4. The oven according to claim 3, wherein the partition is an intermediate base having an inclined separating strip which runs along the path of a winding, and is situated between two successive windings.

5. The oven according to claim 4, wherein the separating strip is cut out of the intermediate base in the shape of a curl.

6. The oven according to claim 4, wherein the windings of the conveyor belt are supported on a drum, and the separating strip extends as far as the drum, leaving a gap clear.

7. The oven according to claim 6, wherein the separating strip is connected over at least part of its periphery to a vertically extending casing, which at least partially surrounds the path in a close-fitting manner.

8. The oven according to claim 7, wherein the separating strip includes means for collecting liquids which drip down from upper windings, and drainage means for draining collected liquids.

9. The oven according to claim 7, wherein each zone has two mutually opposite casing parts for accommodating therebetween the path in a close-fitting manner.

10. The oven according to claim 9, further comprising two flow ducts, which lie one above the other, and are situated between each casing part and an adjacent internal wall of the housing, each of said flow ducts communicating with an associated zone, and heating means and a ventilator for generating a hot air flow being disposed inside each flow duct.

11. The oven according to claim 10, wherein the flow ducts situated one above the other are separated, between each casing part and the adjacent internal wall, by the intermediate base.

12. The oven according to claim 1, wherein the path with a plurality of windings is helical.

13. The oven according to claim 1, wherein the conveyor belt has two mutually connected paths comprising windings, a first one of said paths providing an upward conveying movement, and a second of said paths providing a downward conveying movement, a partition being provided between said paths, said second path passing through at least a first further zone provided with means for setting a cooking state.

14. The oven according to claim 13, wherein the second path passes through a second further zone which is situated beneath the first further zone.

15. Oven for heating food products, comprising:
- a housing defining a plurality of separate zones with at least two of said zones being located above one another;
- each zone having separate means for setting a cooking state in the relevant zone, said cooking state including at least one of temperature and relative humidity;
- a conveyor belt for supporting food products to be heated, said conveyor belt being structured and arranged to run through each of the zones, and having at least one path with a plurality of windings;
- each of said zones having at least one ventilation device and a heating device for circulating hot air through that zone and parallel to a boundary region between two zones; and
- an intermediate base situated between two adjacent zones, said intermediate base having a passage for the conveyor belt.

16. The oven according to claim 15, wherein the intermediate base has an inclined separating strip which runs along the path of a winding, and is situated between two successive windings.

17. The oven according to claim 16, wherein the separating strip is connected over at least part of its periphery to a vertically extending casing, which at least partially surrounds the path in a close-fitting manner.

18. The oven according to claim 17, further comprising two flow ducts, which lie one above the other, and are situated between the casing and an adjacent internal wall of the housing, each of said flow ducts communicating with an associated zone, and heating means and a ventilator being disposed inside each flow duct.

19. The oven according to claim 18, wherein the flow ducts situated one above the other are separated, between each casing part and the adjacent internal wall, by the intermediate base.

20. The oven according to claim 15, wherein the path with a plurality of windings is helical.

* * * * *